(12) United States Patent
Militello et al.

(10) Patent No.: US 6,287,500 B1
(45) Date of Patent: Sep. 11, 2001

(54) METHOD OF MAKING A BRAKE ROTOR FOR A MOTOR VEHICLE

(75) Inventors: Dino Militello; Manfred Roessler, both of Manhattan Beach, CA (US); Ruediger Lichnofsky, Geltendorf (DE); Tilmann Haug, Uhldingen-Muehlhof (DE); Emil Naeumann; Karl-Heinz Roess, both of Ebersbach (DE); Andreas Soens, Deizisau (DE); Detlef Sokolowsky, Esslingen (DE); Claus-Peter Weidner, Stuttgart (DE)

(73) Assignees: DaimlerChrysler AG, Stuttgart (DE); SGL Carbon Composites, Inc., Hitco, Gardena, CA (US)

( * ) Notice: Subject to any disclaimer, the term of this patent is extended or adjusted under 35 U.S.C. 154(b) by 0 days.

(21) Appl. No.: 09/594,019

(22) Filed: Jun. 15, 2000

Related U.S. Application Data

(62) Division of application No. 09/096,358, filed on Jun. 12, 1998, now Pat. No. 6,119,827.
(60) Provisional application No. 60/049,451, filed on Jun. 12, 1997.

(51) Int. Cl.[7] ............................. B29C 65/00; B29C 67/02
(52) U.S. Cl. ......................... 264/248; 264/109; 264/250; 156/89.25; 156/89.26
(58) Field of Search ................................. 264/29.1, 248, 264/257, 81, 113, 250, 109; 156/89.11, 89.25, 89.26

(56) References Cited

U.S. PATENT DOCUMENTS

| | | | | |
|---|---|---|---|---|
| 4,173,681 | * | 11/1979 | Durrieu et al. | 428/409 |
| 4,341,830 | * | 7/1982 | Betts et al. | 428/65 |
| 4,613,473 | * | 9/1986 | Layden et al. | 264/103 |
| 4,917,743 | * | 4/1990 | Gramberger et al. | 156/89 |
| 4,929,505 | * | 5/1990 | Washburn et al. | 728/408 |
| 5,043,123 | * | 8/1991 | Gormanns et al. | 264/113 |
| 5,045,356 | * | 9/1991 | Uemura et al. | 427/249 |
| 5,474,849 | * | 12/1995 | Graef et al. | 428/408 |
| 5,547,628 | * | 8/1996 | Lacombe et al. | 264/257 |
| 5,599,603 | * | 2/1997 | Evans et al. | 428/66.2 |
| 5,688,577 | * | 11/1997 | Smith et al. | 428/113 |
| 5,803,210 | * | 9/1998 | Kohno et al. | 188/73.1 |
| 5,972,157 | * | 10/1999 | Xue et al. | 156/285 |

* cited by examiner

*Primary Examiner*—Jan H. Silbaugh
*Assistant Examiner*—Stefan Staicovici
(74) *Attorney, Agent, or Firm*—Crowell & Moring LLP

(57) ABSTRACT

A method for manufacturing a brake rotor which includes a disc-shaped carrier and friction rings arranged on or on top of the carrier, so that the friction rings and carrier form a single piece construction. The carrier and friction ring(s) are separately molded into pre-forms, subsequently joined and finished formed in a press tool. The carrier and friction rings are made from carbon/carbon materials and ceramic materials respectively. The carrier has a hat-shaped cross-sectional shape with a flanged outer edge and the friction rings are attached to each side of the flanged edge of the carrier. The brake rotor may be directly mounted onto the wheel flange via the carrier using bolts.

12 Claims, 5 Drawing Sheets

METHOD OF MAKING A BRAKE ROTOR FOR A MOTOR VEHICLE

This application is a division of application Ser. No. 09/096,358, filed Jun. 12, 1998 now U.S. Pat. No. 6,119,827. This application claims the benefit of U.S. Provisional Application Ser. No. 60/049,451, filed Jun. 12, 1997.

BACKGROUND AND SUMMARY OF THE INVENTION

This invention relates to a brake rotor constructed from a hat-shaped carrier and at least one friction ring located on or on top of the carrier.

Similar brake rotors are known as components of braking systems, especially for use in motor vehicles. Known brake rotors are made of cast gray iron and comprise a hat-shaped carrier section and a friction ring arranged at the circumference of the carrier section.

Known cast gray iron brake rotors have a coefficient of thermal expansion of $10^{-5}$ $K^{-1}$. They exhibit, at increased temperatures resulting from the application of the brake pads, a radial expansion and also an axial expansion due to the connection of the friction ring with the hat-shaped carrier section (commonly known as umbrella distortion). To minimize undesirable umbrella distortion, known brake rotors employ grooves to block heat transfer.

It is known that to accomplish higher temperature capability, friction rings used in motor sport applications are constructed of carbon/carbon and/or ceramic materials. Drilled holes increase the ventilation of the brake rotor.

The attachment of the friction ring to the hat-shaped brake rotor requires a variety of fastener hardware such as bolts, spacer bushings, nuts, washers etc. This attachment of the friction ring to the brake rotor transmits torque and accommodates the thermal expansion of the different component materials. Because of new carbon/carbon and ceramic friction materials, the brake rotor and fastener components must withstand higher temperatures. The disadvantages of attaching the friction ring to the brake rotor in this manner include a high part number count, the additional assembly work required, and the potentially negative effect on comfort. Required manufacturing tolerances regarding parallelism, thickness and runout have a negative effect regarding comfort even with the known cast gray iron brake rotors.

One object of this invention is to provide a brake rotor which overcomes the disadvantages of brake rotors manufactured per the current state of technology as described above. Another object is to provide a brake rotor that is easy to manufacture and install. In addition, an object is to provide a brake rotor able to operate at higher temperatures without exposing nearby components of the wheel, especially the wheel bearing and rim, to higher temperatures. Moreover, another object of the brake rotor is low cost and preferably low weight.

These and other objects are obtained by the present invention. The brake rotor of the present invention includes a friction ring made of a high performance friction material from the group of fiber reinforced ceramic materials, and a carrier made of a material from the group of carbon/carbon materials; the coefficients of thermal expansion for these materials are at least approximately the same; and the friction ring and carrier are immovably attached to each other. By using the same or similar materials having a low thermal expansion, the occurrence of the previously described umbrella distortion is eliminated. In addition, because of the low thermal conductivity of the carrier material, only a small portion of the heat generated by the braking process is conducted to the wheel bearing and rim of the wheel being braked.

The brake rotor of the present invention is easier to manufacture and assemble than known brake rotors from motor sport, which use a floating assembly, because there are fewer parts to handle. Additionally, the brake rotor of the present invention provides improvements in comfort because tolerance buildup, experienced with known brake rotors due to the assembly of the friction ring to the brake rotor, does not occur with the present invention.

A particularly advantageous configuration of the brake rotor of the present invention is the arrangement of friction rings on both sides of the flanged outside diameter portion of the hat-shaped carrier.

The brake rotor further includes attachment of the friction ring(s) to the carrier by riveting, bonding or a homogeneous material joint.

The brake rotor includes a carrier configuration with recesses on its flange portion for ventilation which cover the radial dimensions of the friction rings attached on both sides and provides cooling to the 5 friction rings. Recesses serve as cooling channels and do not require subsequent drilling or elaborate assembly of brake rotor halves to form cooling channels, as required with known brake rotor configurations. The recesses are readily produced as an integral step in the manufacturing 10 process.

Another aspect of the invention is that the hat-shaped carrier contains a flanged bottom in the center of the part to facilitate a bolted attachment to the wheel flange. Attachment to the wheel flange with bolts is preferred to further reduce the number of required parts for assembly.

The objects of the present invention may be obtained by employing a manufacturing process characterized such that the carrier and the friction ring are molded separately into pre-forms. They are subsequently joined together and finish-formed in a press tool. Accordingly, the carrier and friction rings are separately pre-formed in a molding press and subsequently assembled and finish molded into a single part. The process is proven, very efficient, and highly accurate.

This method of manufacture is especially advantageous where an additional process after the molding process is employed to convert the molded part into carbon/carbon material. Through this process the material transition joint present after molding between friction rings and carrier is eliminated. The result is a seamless material transition—the brake rotor becomes, in effect, a single piece part. This leads to especially homogeneous thermal conductivity as well as very good stability of the brake rotor.

Other objects, advantages and novel features of the present invention will become apparent from the following detailed description of the invention when considered in conjunction with the accompanying drawings.

DETAILED DESCRIPTION OF THE DRAWINGS

Figure 5:
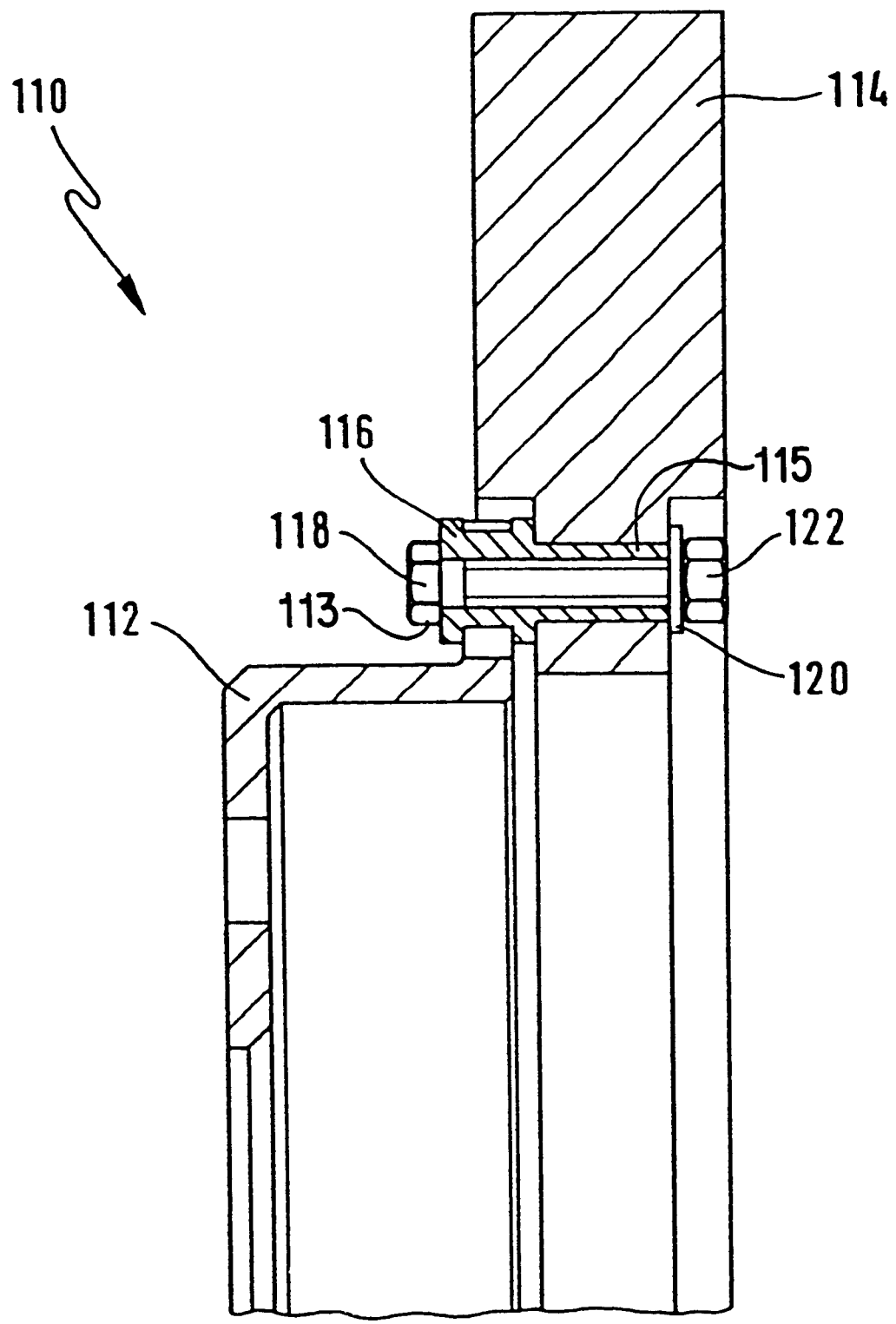
FIG. 5 is a schematic cross-sectional view of a known, current state of the art brake rotor, e.g., used in motor sport applications (for clarity, only the upper portion of the rotationally symmetrical brake rotor is shown).

FIG. 5 shows schematically a known brake rotor. The brake rotor assembly 110 includes a hat-shaped brake rotor 112 and a friction ring 114 mounted on the circumference of brake rotor 112. Friction ring 114 is attached to brake rotor 112 by spacer bushing 116, where hex head bolt 118 passes through and extends beyond spacer bushing 116, and washer 120 is placed over the extended end of hex head bolt 118 and hex head nut 122 is fastened to the end of hex head bolt 118. The key feature of the attachment is that spacer bushing 116 is engaged with matching slots 113 in brake rotor 112 prior to insertion of spacer bushing 116 into the mounting holes 115 in friction ring 114.

In FIG. 5, the known brake rotor assembly 110 is a carbon/carbon brake rotor used, for example, in motor sports. Friction ring 114 is made from a carbon/carbon material and hat-shaped brake rotor 112 is made from a metallic material. Friction ring 114 is fastened to brake rotor 112 as described above. Cooling channels to facilitate ventilating the interior of the friction ring of the known brake rotor have to be machined by separately drilling each hole. The run out accuracy suffers because the brake rotor assembly 110 is assembled by attaching two parts (hat-shaped brake rotor 112 and friction ring 114). An elaborate assembly technique, as described, is necessary to prevent destruction of the friction ring due to different coefficients of thermal expansion for friction ring 114 and hat-shaped brake rotor 112.

Figure 1:
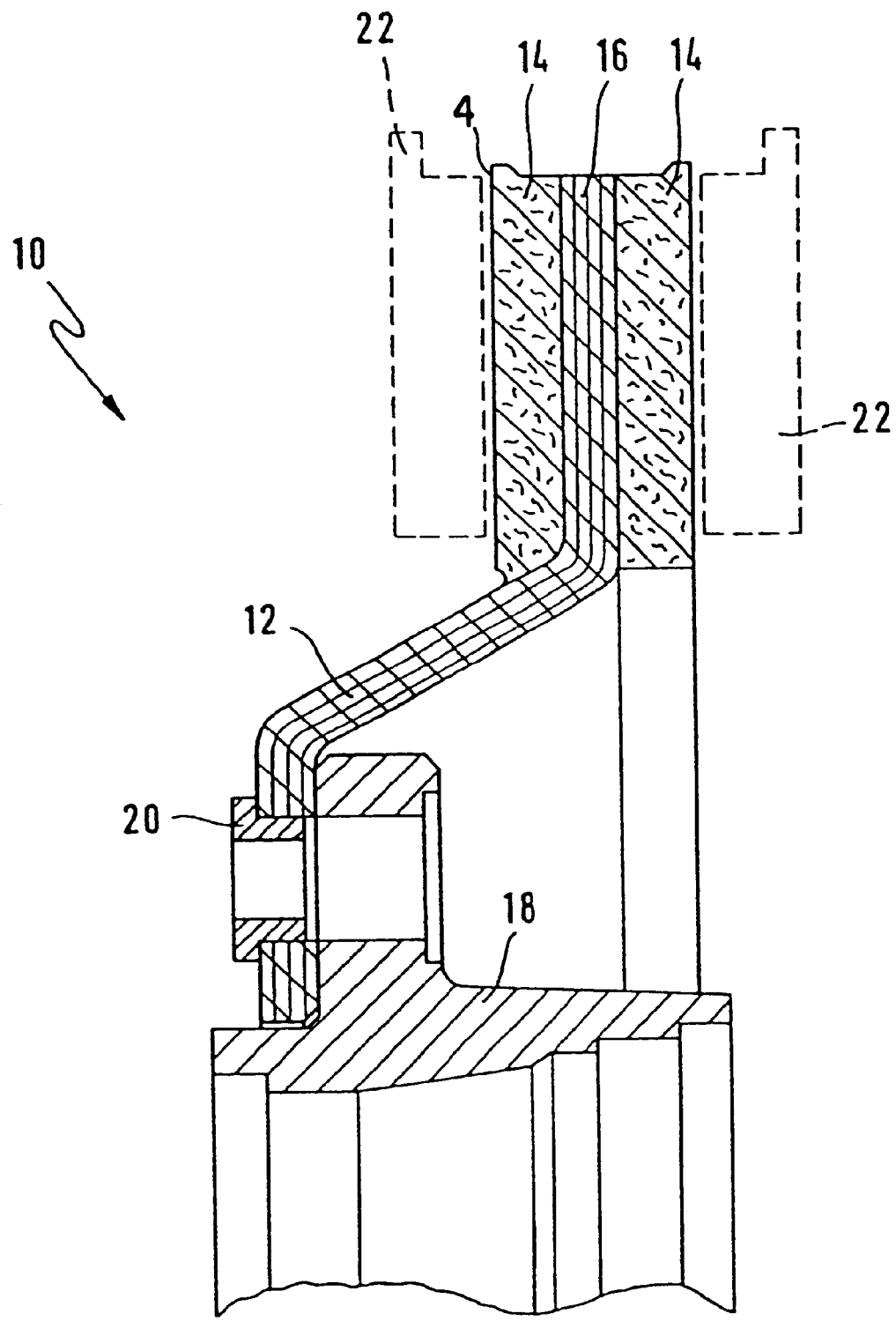
FIG. 1 is a schematic cross-sectional view of a brake rotor for a first embodiment according to the present invention.

Referring to FIG. 1, a first embodiment of the brake rotor of the present invention is shown. The brake rotor 10 comprises carrier 12 and friction rings 14 located on either side of carrier 12. Carrier 12 is essentially a disc with the cross sectional shape of a top hat or a pot with a flanged outer edge 16. The friction rings 14 are located on either side of flanged outer edge 16 and immovably attached to carrier 12. Carrier 12 is attached to wheel flange 18, by bushings 20 in the bolt holes, whereby reinforcement of the bolt holes can be accomplished using metallic bushings 20.

According to the invention, carrier 12 and friction rings 14 are made from high performance friction materials such as carbon/carbon or ceramics. The carrier material is preferably of a laminated structure to achieve especially good mechanical properties for torque transmission. The friction ring material is preferably "chopped" friction material. The material for carrier 12 and the material for friction rings 14 are molded to the desired pre-form in the "green" state (not fully cured), utilizing press tools, and parts are subsequently joined and finish molded in a combination mold tool. Processing to fully cure and convert the molded part to carbon/carbon follows. This process results in an especially sound and rigid transition bond between the materials utilized materials for carrier 12 and friction rings 14, producing a "single piece" configuration of brake rotor 10. The final finish fabrication involves standard turning and grinding operations.

FIG. 1 also shows, in broken lines, the brake pads 22 located on either side of friction rings 14 and are separated therefrom by a small air gap 4. Brake actuation occurs in the known fashion by pressing brake pads 22 onto friction rings 14.

Figure 2B:
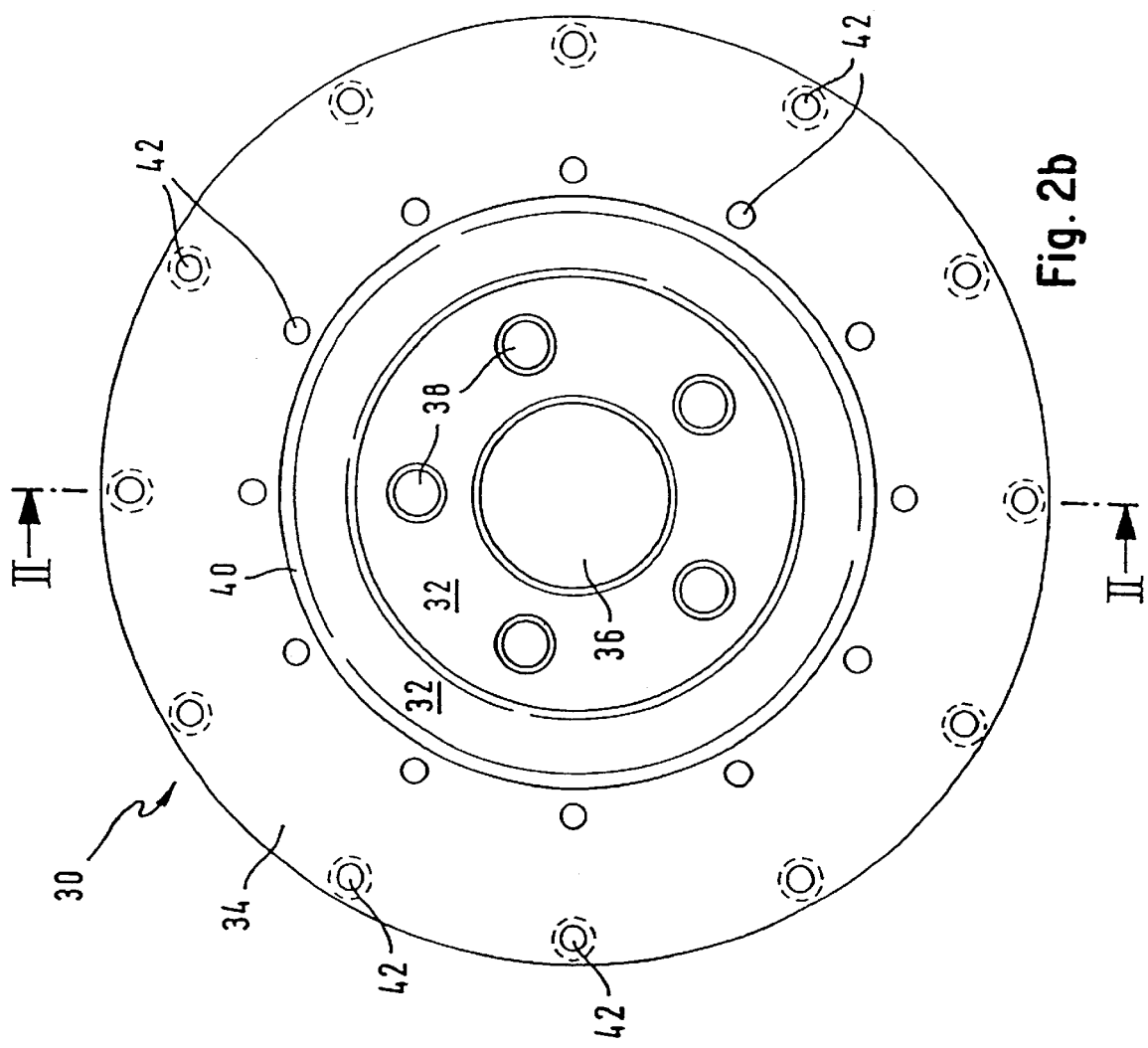
FIG. 2b is a schematic top view of a brake rotor for a second embodiment according to the invention.
Figure 2A:
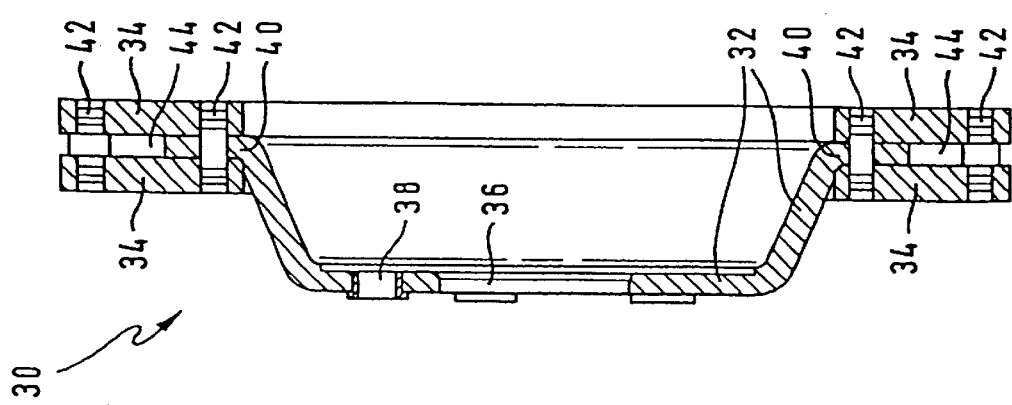
FIG. 2a is a schematic cross-sectional view of a brake rotor for a second embodiment taken along section line II—II of FIG. 2b.

The first embodiment of the invented brake rotor shown in FIG. 1 depicts a solid brake rotor without any cooling holes or channels. FIG. 2a and FIG. 2b show a second embodiment of the invented brake rotor 30. FIG. 2b shows a top view of brake rotor 30, and FIG. 2a shows a cross section of brake rotor 30 taken along section line II—II.

According to the invention, brake rotor 30 includes a carrier 32 with a hat-shaped cross-section (See FIG. 2a). The disc portion of carrier 32 has a central opening 36 used to mount brake rotor 30 onto a wheel flange (not shown). Five bolt holes 38 required to attach carrier 32 to the wheel flange, are symmetrically arranged surrounding the central opening 36.

Friction rings 34 are attached to each side of flanged edge 40 of carrier 32 forming a "single piece" construction with carrier 32 as explained above. Friction rings 34 show several attachment pins 42 which, in the depicted embodiment, are positioned radially and symmetrically. As shown in the cross-sectional view of FIG. 2a, the friction rings 34, extend beyond the edge 40 of carrier 32 and create the cavities 44 in between, which contribute to cooling the brake rotor.

Figure 3B:
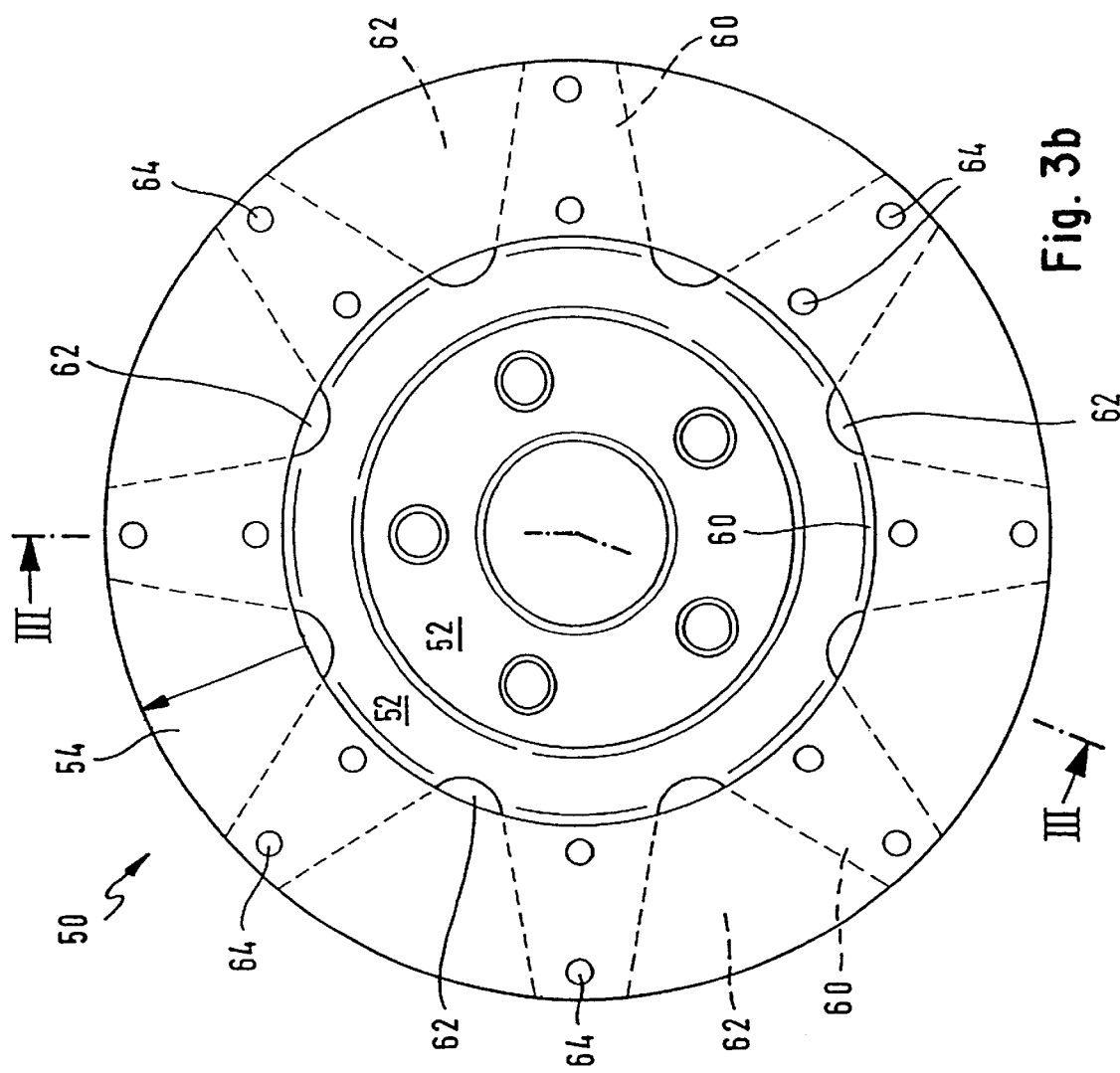
FIG. 3b is a schematic top view of a brake rotor for a third embodiment according to the invention.
Figure 3A:
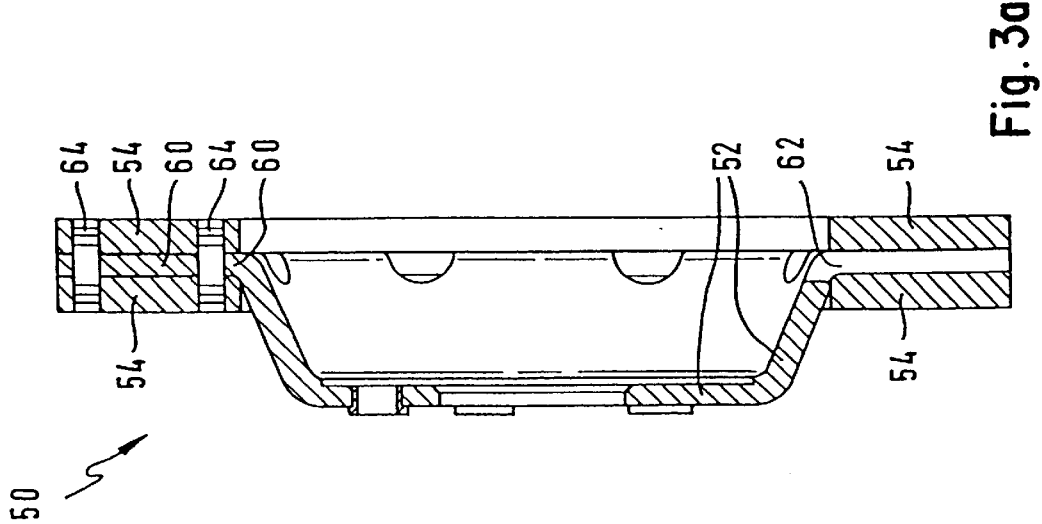
FIG. 3a is a schematic cross-sectional view of a brake rotor for a third embodiment taken along section line III—III of FIG. 3b.

A third embodiment of the invented brake rotor is shown in FIG. 3a and FIG. 3b. FIG. 3b shows a top view of the invented brake rotor 50 and FIG. 3a shows a cross section of brake rotor 50 taken along section line III—III of FIG. 3b.

According to the invention, brake rotor 50 includes a carrier 52 which shows, as mentioned above, a hat-shaped cross section with flanged edge 60. Flanged edge 60 as shown in FIG. 3a and FIG. 3b does not have the continuous outside diameter edge as was shown in the examples of FIG. 2a and FIG. 2b. As shown in the top view of FIG. 3b, recesses 62 give the flanged edge 60 a star-like appearance.

Friction rings 54 are, as explained above, immovably attached on either side of the flanged edges 60 so as to span the recesses 62, thus forming a "single piece" part with carrier 52. Cavities are formed in the region of the recesses 62 and between the opposing friction rings 54 which facilitate cooling. In addition, friction rings 54 show attachment pins 64 similar to those attachment pins 42 shown in the embodiment of FIG. 2.

Figure 4:
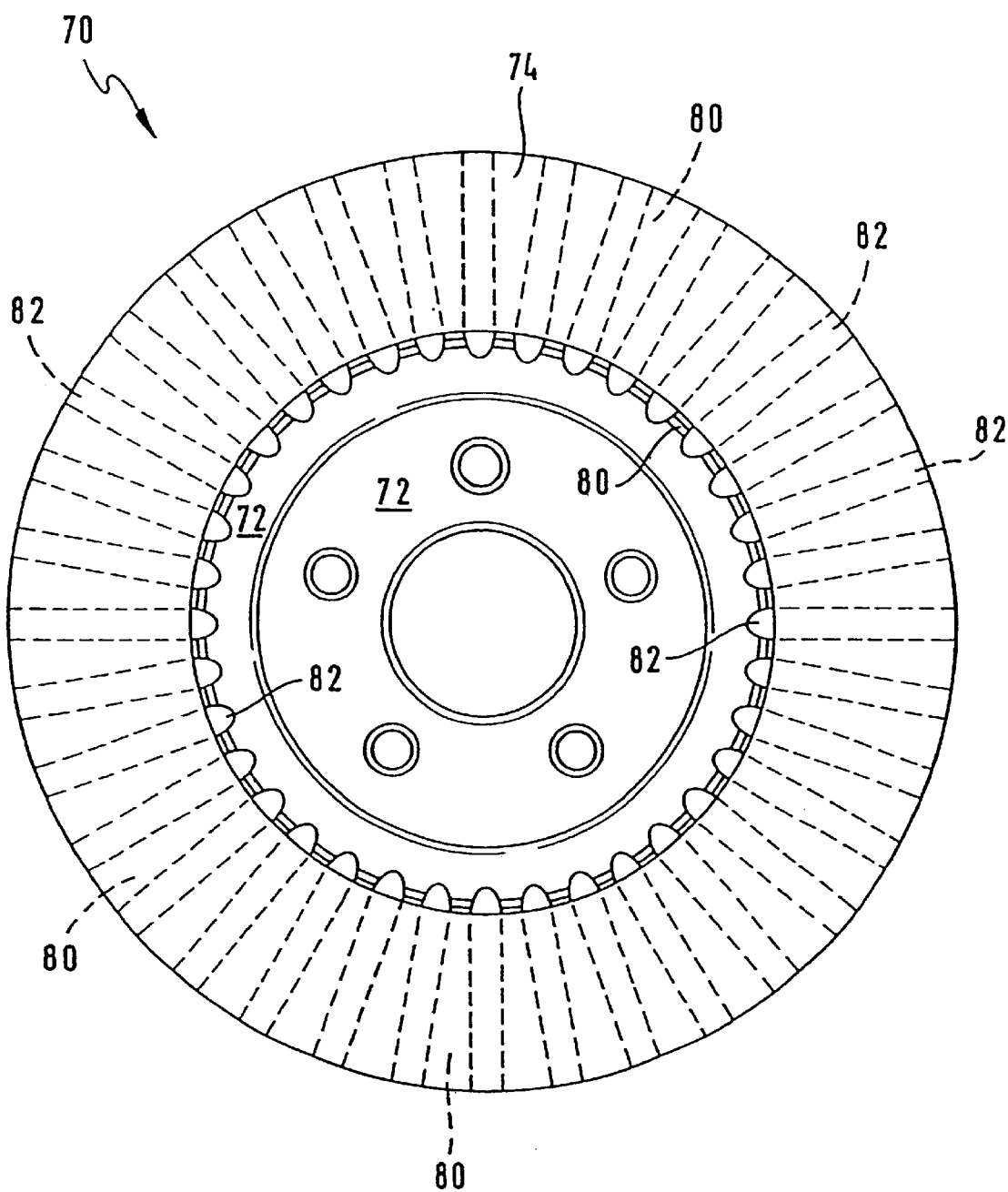
FIG. 4 is a schematic top view of a brake rotor for a fourth embodiment according to the invention.

FIG. 4 is a top view of an additional, fourth embodiment of the invented brake rotor. Brake rotor 70 is similar to the above described embodiment and includes a carrier 72. Friction rings 74 are attached to either side of the flanged edge 80 of carrier 72. As depicted in the embodiment of FIG. 3a and FIG. 3b, brake rotor 70 also employs recesses 82 in the flanged edge 80, forming smaller but more numerous elongated, narrow cut-outs compared to recesses 62 of the example shown in FIG. 3a and FIG. 3b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for manufacturing a brake rotor, comprising:

separately molding a carrier and at least one friction ring into pre-forms, subsequently joining the carrier and the at least one friction ring together, and finish-forming the joined carrier and the at least one friction ring in a press tool, wherein the carrier and friction ring comprise different materials having a low thermal expansion coefficient selected such that the coefficient of thermal expansion of the carrier material is at least approximately the same as the coefficient of thermal expansion of the at least one friction ring material, whereby umbrella distortion during operation is minimized.

2. The method of claim 1, wherein the carrier is a hat-shaped carrier.

3. The method of claim 1, wherein the carrier is a hat-shaped carrier with a flanged edge.

4. The method of claim 1, wherein the carrier is a hat-shaped carrier with a flanged edge, and two fiction rings are provided, one each being attached to different sides of the flanged edge.

5. The method of claim 3, wherein the hat-shaped carrier has at least one recess formed in an area of the flanged edge, the at least one recess reaching across a radial flanged dimension of the two friction rings, whereby the friction rings are ventilated.

6. The method of claim 4, wherein the hat-shaped carrier has at least one recess formed in an area of the flanged edge, the at least one recess reaching across a radial flanged dimension of the two friction rings, whereby the friction rings are ventilated.

7. The method of claim 2, wherein the hat-shaped carrier is formed with a central opening and an adjacent attachment flange for attachment to a wheel flange.

8. The method of claim 4, wherein the hat-shaped carrier is formed with a central opening and an adjacent attachment flange for attachment to a wheel flange.

9. The method of claim 6, wherein the hat-shaped carrier is formed with a central opening and an adjacent attachment flange for attachment to a wheel flange.

10. The method of claim 1, further comprising selecting the carrier material to be a carbon/carbon material.

11. The method of claim 1, further comprising selecting the friction ring material to be a fiber-reinforced ceramic material.

12. The method of claim 1, further comprising selecting the carrier material to be a carbon/carbon material and selecting the friction ring material to be a fiber-reinforced ceramic material.

* * * * *